United States Patent
Hou et al.

(10) Patent No.: US 9,337,973 B2
(45) Date of Patent: May 10, 2016

(54) METHOD OF COOPERATIVE MIMO WIRELESS COMMUNICATION AND BASE STATION USING THE SAME

(71) Applicant: Industrial Technology Research Institute, Hsinchu (TW)

(72) Inventors: Hsin-An Hou, New Taipei (TW); Wan-Yi Lin, Taipei (TW); Yung-Han Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 189 days.

(21) Appl. No.: 14/016,245

(22) Filed: Sep. 3, 2013

(65) Prior Publication Data

US 2014/0071912 A1    Mar. 13, 2014

Related U.S. Application Data

(60) Provisional application No. 61/699,304, filed on Sep. 11, 2012.

(51) Int. Cl.
*H04W 4/00* (2009.01)
*H04L 5/00* (2006.01)
(Continued)

(52) U.S. Cl.
CPC .............. *H04L 5/0035* (2013.01); *H04B 7/024* (2013.01); *H04B 7/0413* (2013.01); *H04B 7/0689* (2013.01); *H04B 7/063* (2013.01); *H04L 5/0037* (2013.01)

(58) Field of Classification Search
CPC ..................................................... H04W 28/04

USPC .......................................................... 370/329
See application file for complete search history.

(56) References Cited

U.S. PATENT DOCUMENTS 7,529,311 B2    5/2009   Shen et al.
7,738,437 B2    6/2010   Ma et al.
(Continued)

FOREIGN PATENT DOCUMENTS

CN      101208887    6/2008
CN      101908949    12/2010
(Continued)

OTHER PUBLICATIONS

Wang et al., "Cooperative MIMO Channel Models: A survey," Communications Magazine, IEEE, Feb. 2010, pp. 80-87, vol. 48, No. 2.
(Continued)

*Primary Examiner* — Samina Choudhry
(74) *Attorney, Agent, or Firm* — Jianq Chyun IP Office (57) ABSTRACT

The present disclosure proposes a method of cooperative MIMO wireless communication, and a base station using the same. A base station would have a plurality of radio remote units (RRUs), and each of the RRUs may have a specific radio coverage and a plurality of antennas coupled to each of the RRUs. The function of the base station may include receiving a UE information, receiving a service flow, deriving a service type of the service flow, and determining a MIMO scheme, modulating the service flow into a MIMO stream according to the MIMO scheme, allocating a plurality of resource blocks, wherein the resource blocks may correspond to a portion or all of the RRUs, distributing the MIMO stream into a plurality of downlink sub streams and transmitting the downlink sub streams through the resource blocks by the RRUs corresponding to the resource blocks.

28 Claims, 8 Drawing Sheets

(51) Int. Cl.
*H04B 7/02* (2006.01)
*H04B 7/04* (2006.01)
*H04B 7/06* (2006.01)

(56) References Cited

U.S. PATENT DOCUMENTS

| | | | |
|---|---|---|---|
| 8,027,301 | B2 | 9/2011 | Oyman et al. |
| 8,135,337 | B2 | 3/2012 | Larsson |
| 8,218,422 | B2 | 7/2012 | Venturino et al. |
| 2008/0075033 | A1 | 3/2008 | Shattil |
| 2008/0175237 | A1* | 7/2008 | Kim ............................ 370/389 |
| 2010/0067435 | A1 | 3/2010 | Balachandran et al. |
| 2010/0085917 | A1 | 4/2010 | Gorokhov et al. |
| 2010/0120441 | A1* | 5/2010 | Wan et al. ...................... 455/446 |
| 2010/0284351 | A1* | 11/2010 | Liang et al. ................... 370/329 |
| 2011/0268077 | A1 | 11/2011 | Wan et al. |
| 2012/0189077 | A1 | 7/2012 | Seo et al. |
| 2012/0207145 | A1 | 8/2012 | Han et al. |
| 2012/0281556 | A1 | 11/2012 | Sayana et al. |

FOREIGN PATENT DOCUMENTS

| | | |
|---|---|---|
| CN | 101938299 | 1/2011 |
| CN | 101959195 | 1/2011 |
| CN | 102025460 | 4/2011 |
| CN | 102142875 | 8/2011 |
| CN | 102428661 | 4/2012 |
| CN | 102546080 | 7/2012 |
| CN | 102684764 | 9/2012 |
| CN | 102742173 | 10/2012 |
| CN | 102804832 | 11/2012 |
| EP | 2398155 | 12/2011 |
| EP | 2524455 | 11/2012 |
| EP | 2532112 | 12/2012 |
| KR | 101128758 | 4/2012 |
| KR | 20120070139 | 6/2012 |
| KR | 20120113801 | 10/2012 |
| WO | 2011060736 | 5/2011 |
| WO | 2012096393 | 7/2012 |
| WO | 2012146280 | 11/2012 |
| WO | 2013023290 | 2/2013 |

OTHER PUBLICATIONS

Gesbert et al., "Multi-Cell MIMO Cooperative Networks: A New Look at Interference," IEEE Journal on Selected Areas in Communications, Dec. 2010, pp. 1380-1408, vol. 28, No. 9.
LG, "LTE-Advanced: Generals," 3GPP RAN1 Status report, May 27, 2011, pp. 1-236.
Nasser et al., "System Level Evaluation of Innovative Coded MIMO-OFDM Systems for Broadcasting Digital TV," International Journal of Digital Multimedia Broadcasting, Aug. 2008, 12 pages.
IEEE Computer Society and the IEEE Microwave Theory and Technigues Society, "IEEE Standard for Local and metropolitan area networks Part 16: Air Interface for Broadband," May 29, 2009.
Seidel, "Initial thoughts on LTE Advanced for 3GPP Release 10," LTE World Summit, May 19, 2009, Berlin.
Lin et al., "Spatial Frequency Scheduling for Uplink SC-FDMA based Linearly Precoded LTE Multiuser MIMO Systems," European Transactions on Telecommunications, Apr. 2010, pp. 213-223, vol. 21, Issue 3.
She et al., "Precoding and Scheduling Techniques for Increasing Capacity of MIMO Channels," NTT DOCOMO Technical Journal, Mar. 2009, pp. 38-44, vol. 10, No. 4.
"Two-Dimensional Block-Spread CDMA Relay Using Virtual-Four-Antenna STCDTD," IEEE Transactions on Vehicular Technology, Oct. 2013, pp. 3813-3827, vol. 62, No. 8.
Bacci et al., "INFSCO-ICT-216203 DAVINCI D2.1.3 v1.0 Proposals for IMT-Advanced systems, issue 1," DAVINCI, Jun. 30, 2009, pp. 1-151.
"Office Action of Taiwan Counterpart Application", issued on Apr. 7, 2015, p. 1-p. 10.

* cited by examiner

METHOD OF COOPERATIVE MIMO WIRELESS COMMUNICATION AND BASE STATION USING THE SAME

CROSS-REFERENCE TO RELATED APPLICATION

This application claims the priority benefits of U.S. provisional application Ser. No. 61/699,304, filed on Sep. 11, 2012. The entirety of the above-mentioned patent applications is hereby incorporated by reference herein and made a part of this specification.

TECHNICAL FIELD

The technical field relates to a method of implementing cooperative multiple-input-multiple-output (MIMO) wireless communication and a base station using the same.

BACKGROUND

As requirements of high data rate transmission under limited frequency spectra and capital expenses are increasing, applications of the small cell communication system are also rising. In this kind of small cell communication systems, installations of high-density base stations which uses lower transmitting power would become more flexible and economical by separating out remote radio units (RRUs) from baseband units (BBUs) of a base station. One commonly utilized technique would be to keep BBUs in a base station while RRUs could be disposed in one or more remote locations in order to extend the wireless coverage of a base station. When RRUs disposed at remote locations relative to a base station, RRUs could be connected to the BBUs of a base station via an interface, such as a fiber optical interface, and thus RRUs can be deployed at different geographical locations to extend the coverage of a base station.

SUMMARY

Accordingly, the present disclosure proposes a method of implementing cooperative multiple-input-multiple-output (MIMO) wireless communication and a base station using the same method. The method is configured for a base station which has a plurality of radio remote units (RRUs) as each of the RRUs has a specific radio coverage as well as a plurality of antennas coupled to each of the RRUs. The method would include at least but not limited to the steps of receiving an user equipment (UE) information, receiving a service flow, deriving a service type of the service flow and determining a MIMO scheme according to the service type and the UE information. And in transmission phase, the method would further include at least but not limited to the steps of modulating the service flow into a MIMO stream by the MIMO scheme, allocating a plurality of resource blocks according to the MIMO scheme, the UE information and the service type, wherein the resource blocks corresponds to part or all of the RRUs, and distributing the MIMO stream into a plurality of downlink sub streams and transmitting the downlink sub streams through the resource blocks by the RRUs corresponding to the resource blocks.

Accordingly, the present disclosure proposes a base station which would include at least but not limited to a plurality of radio remote units (RRUs), a data processing unit, a plurality of baseband units (BBUs) and a mapping unit. Each of the RRUs may have a radio coverage and a plurality of antennas coupled to each of the RRUs. The data processing unit would be configured to receive a service flow. The BBUs respectively coupled between the data processing unit and the RRUs. The mapping unit is coupled to the BBUs and the data processing unit. The mapping unit would be configured to derive a service type of the service flow, receive a user equipment (UE) information through the BBUs and the RRUs and determine a MIMO scheme according to the service type and the UE information. The data processing unit modulates the service flow into a MIMO stream by the MIMO scheme. The mapping unit would allocate a plurality of resource blocks according to the MIMO scheme and the service type and transmits an allocation information to the data processing unit, wherein the resource blocks corresponds to part or all of the RRUs, and the allocation information corresponds to the allocated resource blocks.

Several exemplary embodiments accompanied with figures are described in detail below to further describe the disclosure in details.

DETAILED DESCRIPTION OF DISCLOSED EMBODIMENTS

The accompanying drawings are included to provide further understanding, and are incorporated in and constitute a part of this specification. The drawings illustrate exemplary embodiments and, together with the description, serve to explain the principles of the disclosure.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of" and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art. Therefore, The term "base station" in this disclosure could be, for instances, an evolved Node B or eNodeB, a Node-B, a base transceiver system (BTS), an access point, a home base station, a relay station, a scatterer, a repeater, an intermediate node, an intermediary, and/or satellite-based communication base stations, and so forth.

Figure 1:
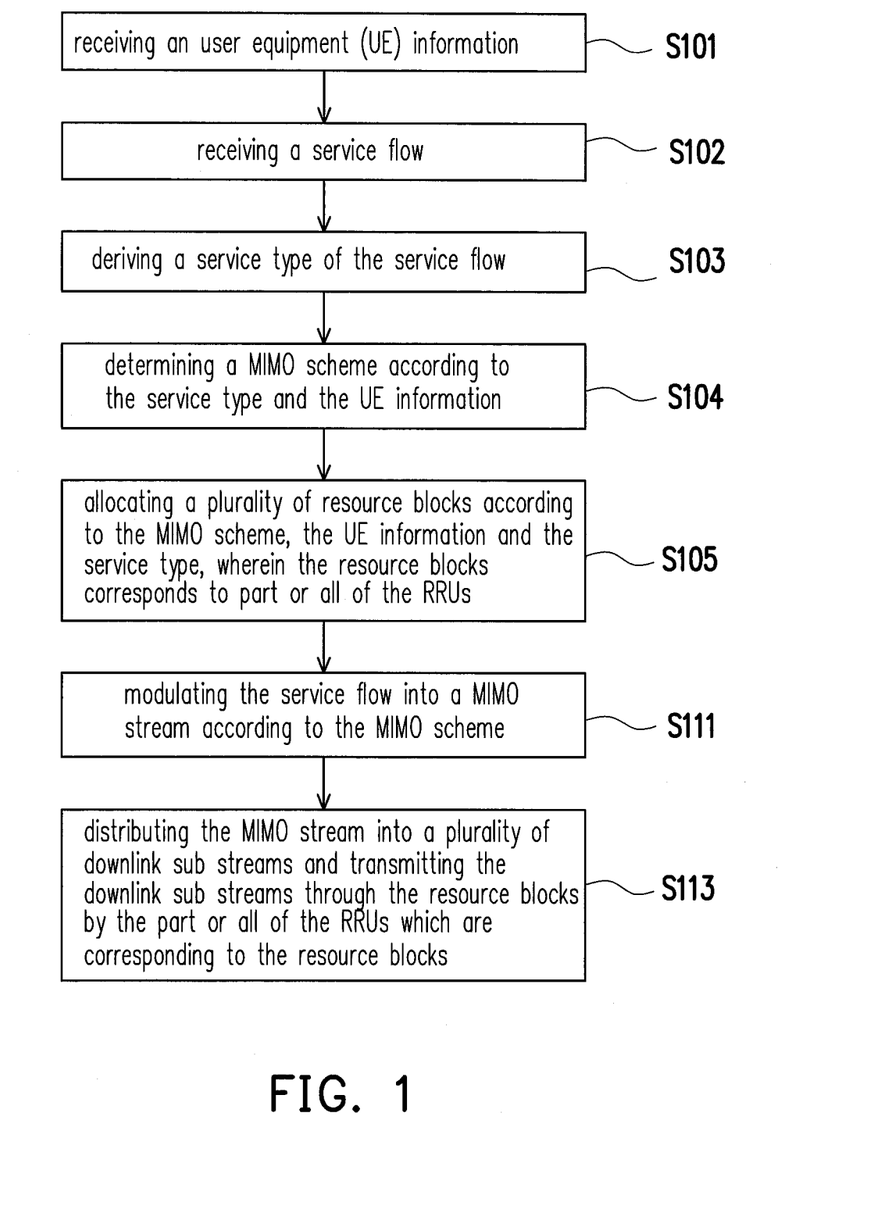
FIG. 1 is a flow chart illustrating a method for cooperative multiple-input-multiple-output (MIMO) wireless communication system according to one of the exemplary embodiments.

FIG. 1 illustrates an exemplary method of implementing a cooperative multiple-input-multiple-output (MIMO) wireless communication from the perspective of a base station which would be configured with a plurality of radio remote units (RRUs), and each of the RRUs would have a specific radio coverage and a plurality of antennas disposed on each of the RRUs.

Referring to FIG. 1, in step S101, an user equipment (UE) information would be received by the base station. In step S102, a service flow would be received by the base station. In step S103, the base station would discern a service type of the service flow and hence in step S104, a MIMO scheme could be determined according to the service type and the UE information. In step S105, a plurality of resource blocks would be allocated according to the MIMO scheme, the UE information and the service type, wherein the resource blocks would correspond in part or to all of the RRUs.

In this disclosure, the method includes steps of transmission phase and steps of receiving phase. For example, in transmission phase of the present exemplary embodiment, the method further includes the following step S111~S113. In step S111, the service flow would be modulated into a MIMO stream according to the MIMO scheme. In step S113, the MIMO stream would be distributed into a plurality of downlink sub streams, and the RRUs corresponding to the resource blocks would transmit the downlink sub streams through the resource blocks.

Figure 2:
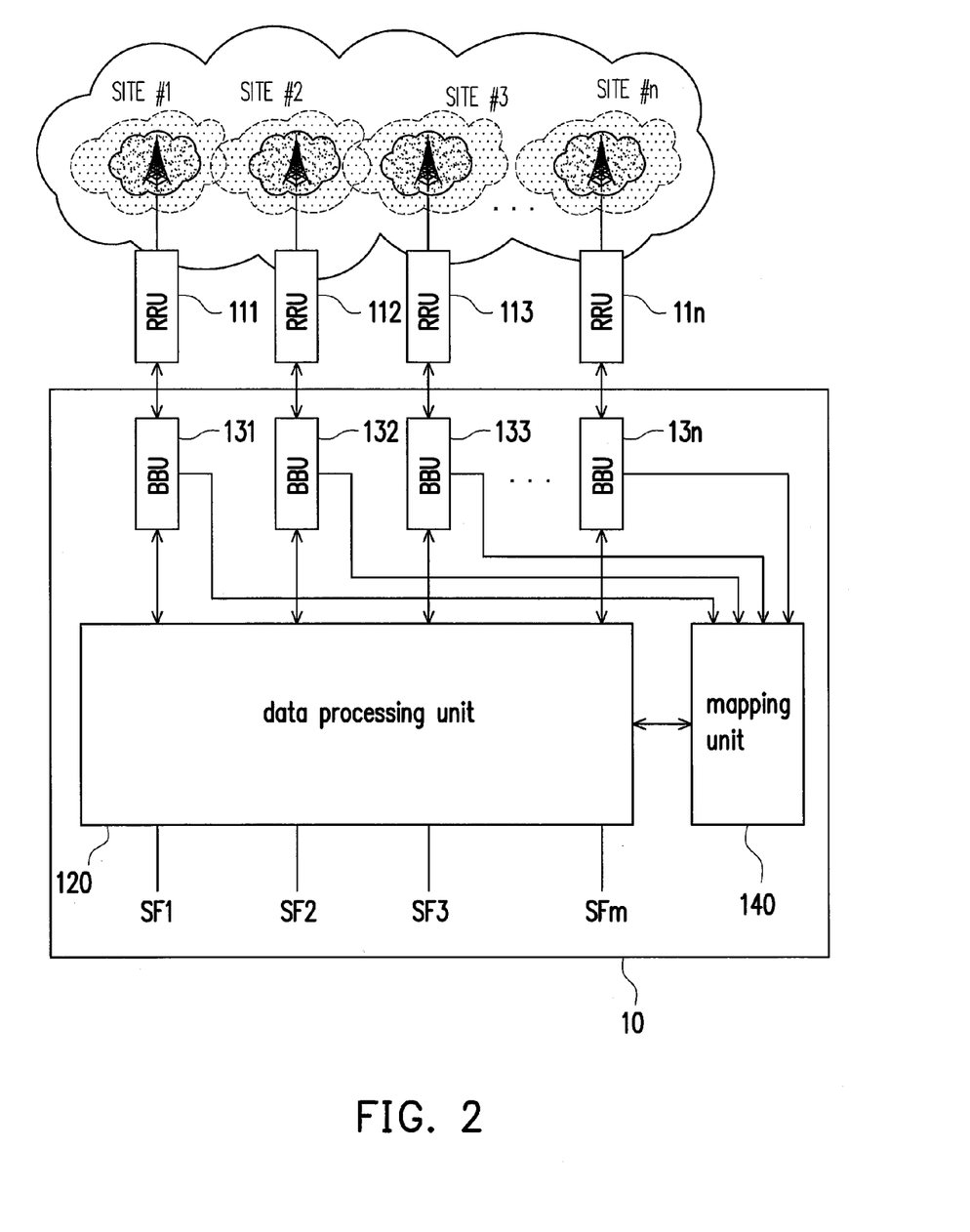
FIG. 2 is a schematic diagram illustrating a base station for cooperative multiple-input-multiple-output (MIMO) wireless communication system according to one of the exemplary embodiments.

FIG. 2 is a schematic diagram illustrating an exemplary base station configured for a cooperative multiple-input-multiple-output (MIMO) wireless communication system in accordance with one of the exemplary embodiments. Referring to FIG. 2, the base station 10 may include at least but not limited to multiple radio remote units (RRUs) 111~11n, a processing unit 120, one or more baseband units (BBUs) 131~13n and a mapping unit 140.

RRU 111~11n would be remote from the base station 10, i,e., RRU 111~11n which could be deployed in multiple locations. In order to achieve the MIMO transmission between RRU 111~11n and user equipments (UE) (not shown), a plurality of antennas could be disposed in each of the RRU 111~11n. The number of antennas coupled to each RRU could be a power of 2, for instance, 2, 4, or 8 antennas for each RRU. RRU 111~11n and the corresponding antennas are respectively disposed between site #1, #2, to site #n, wherein site #1, #2, to site #n could be referred as n numbers of different geographical locations. Each of the RRUs would have specific a radio coverage; However the radio coverage of RRU 111~11n could at least be partially overlapped with each other, and the overlapped coverage of the RRU 111~11n would facilitate a cooperative MIMO transmission ability (e.g., a site diversity scheme, which would be described in the descriptions below) with the RRU 111~11n.

The RRU 111~11n could be partially or fully independent from baseband specifications. In other words, when there's a need to update the communication system (such as, to update the infrastructure of the base station 10), the operator of the base station 10 may choose to upgrade the BBU 131~13n only while keeping the installed RRU 111~11n unchanged or slightly modified. Also, gathering all the BBU 131~13n in one pool (i.e., disposing all BBUs in inside of the main body of base station 10) would make the physical signaling exchange possible and also would form the basis of cooperative MIMO signal processing. Further details of the cooperative MIMO signal processing would be introduced in exemplary embodiments below.

The data processing unit 120 coupled to RRU 111~11n would receive a service flow (e.g. service flow SF1-SFm) from a plurality of application layer service providers (e.g. m service providers in this exemplary embodiment). The baseband units (BBUs) 131~13n, would be respectively coupled between the data processing unit and the RRU 111~11n. The BBU 131~13n would be configured to respectively transmit baseband signals, such as data streams (i.e. MIMO steam or downlink/uplink sub stream in this disclosure), to the RRU 111~11n. In the exemplary embodiment of FIG. 2, the BBU 131~13n would be respectively coupled to the RRU 111~11n electrically such as through a fiber optic cable, so the BBU 131~13n respectively would also transform the baseband signals received from the data processing unit 120 to optical signals, and then would transmit the optical signals to the RRU 111~11n through fiber optic cables.

The mapping unit 140 would be coupled to the BBU 131~13n and the data processing unit 120. The mapping unit 140 would receive a UE information from the BBU 131~13n and the RRU 111~11n. The UE information may include information of all the UE in the coverage of all of the RRU 111~11n, in other words, the information of all the UEs that may transmit/receive downlink/uplink signals through the base station 10. The UE information may include an UE identifier, and one or multiple parameters that could be used to indicate the location of the UE (UE location), signal strength, signal to noise ratio, round trip time and between each of the UEs with part or all the RRU 111~11n that corresponds to each of the UEs respectively. As a result, the mapping unit 140 may identify each of the UEs in the coverage of the RRU 111~11n, estimating the location of each of the UEs using the parameters in the UE information, and associating each of the UEs with one or more RRUs 111~11n, such as the RRUs 111~11n whose coverage covers the location of the UE.

When the data processing unit 120 receives a service flow (i.e., a one of the service flow SF1~SFm), the mapping unit 140 would derive a service type of the service flow, and determines a MIMO scheme according to the service type and the UE information. After the MIMO scheme is determined, the mapping unit 140 would send a control signal including the MIMO scheme to the data processing unit, so that the data processing unit 120 may modulate the service flow into a MIMO stream by the MIMO scheme.

Also, the mapping unit 140 would allocate a plurality of resource blocks according to the MIMO scheme, the UE information and the service type, and would transmit an allocation information to the data processing unit 120, wherein the resource blocks would correspond to part or all of the RRUs, and the allocation information would correspond to the allocated resource blocks. The mapping unit 140 would also transmit the allocation information to the data processing unit 120. After receiving the allocation information, the data processing unit 120 would distribute the MIMO stream to a plurality of downlink sub streams according to the allocation information and transmits the downlink sub streams to part or all of RRU 111~11n corresponding to the resource blocks via the BBU 131~13n. Part or all RRU 131~11n transmit the downlink sub streams according to the allocated resources blocks when receiving the downlink sub streams.

In this disclosure, the mapping unit 140 could be viewed as a controller that controls how the data processing unit 120 and the RRU 111~11n may transmit the service flow to the corresponding UE(s) and how the data processing unit 120 and the RRU 111~11n may receive the corresponding signal back from the UE(s) using part or all of RRU 111~11n that associated with corresponding UE(s) with cooperative MIMO transmission ability.

Figure 3:
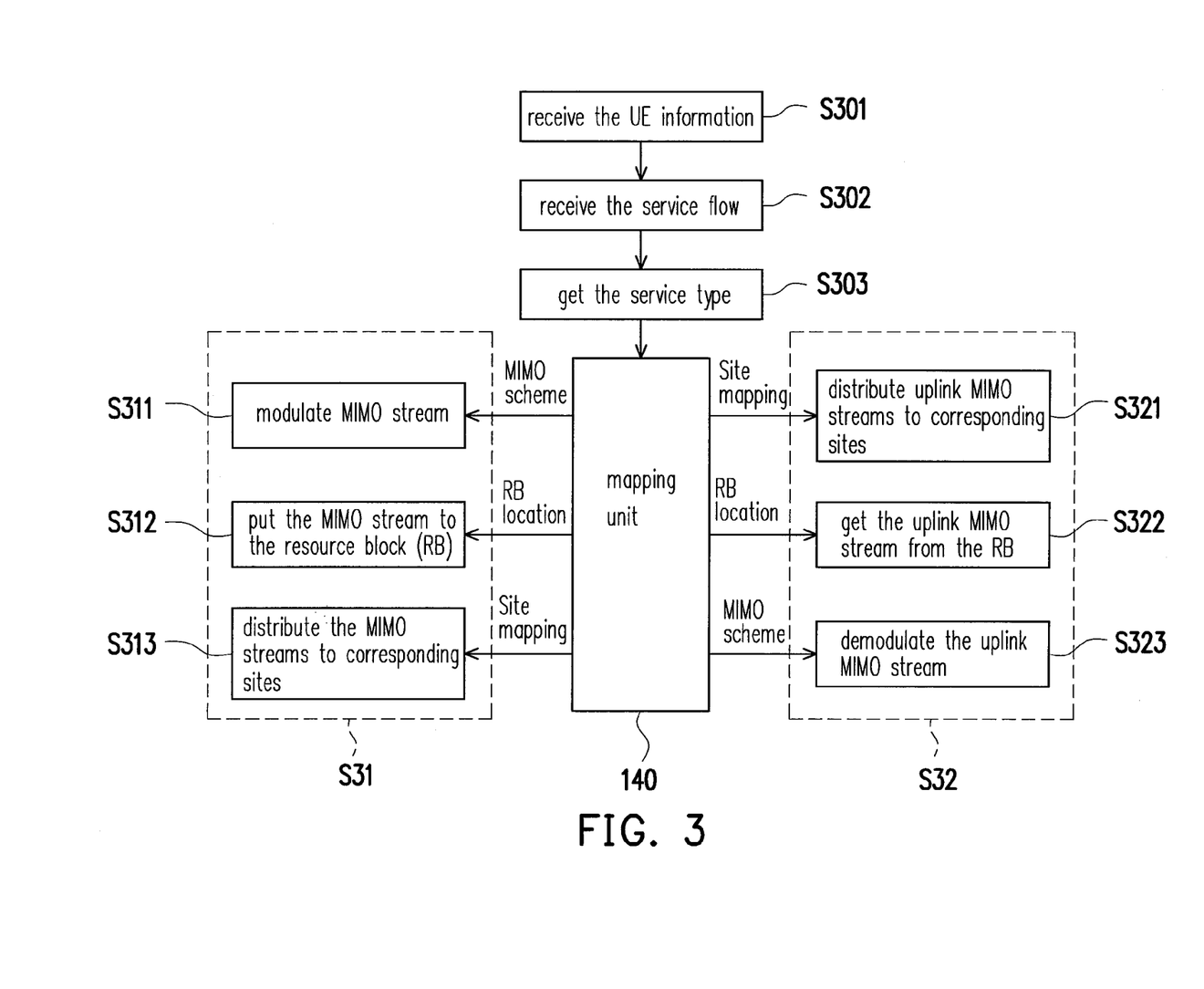
FIG. 3 is a schematic diagram illustrating a data flow of a mapping unit of a base station for cooperative MIMO wireless communication system according to one of the exemplary embodiments.

FIG. 3 is a schematic diagram illustrating data flows of a mapping unit of a base station for cooperative MIMO wireless communication system according to an exemplary embodiment. In FIG. 3, relationships between mapping unit 140 and data flow of a downlink signal and an uplink signal would be described, wherein process of transmission phase S31 illustrates the relationship between the mapping unit 140 and the downlink signal processing (signal processing from the base station 10 to the UE), and the process of receiving phase S32 illustrates the relationship between the mapping unit 140 and the uplink signal processing (signal processing from the UE to the base station 10).

Referring to FIGS. 2 and 3, the mapping unit 140 would first receive the UE information to identify all the UEs that in the coverage of the RRU 111~11n, and the corresponding RRUs (e.g., part of the RRUs 111~11n whose coverage cover the location of UE) of each of the UEs (step S301). Then, the mapping unit 140 detect that a service flow (e.g., one of service flow SF1-SFm in FIG. 2) is received by the data processing unit 120 (step S302), and the mapping unit 140 further derives a service type of the service flow (step 303).

In this exemplary embodiments, the service type may include a broadcast service type, a multicast service type, and the unicast service type, which respectively corresponds to a service flow that broadcast to all UEs, some specified UEs, or only one UE in the coverage of RRU 111~11n. Assuming that the relationship between the location of UE(s) and the RRU 111~11n would be determined (the determination mechanism would be described latter in the disclosure), after the service type of the service flow is derived, the mapping unit 140 would determine a MIMO scheme according to the service type and also the relationship between the location of UE(s) and part or all of the RRUs (e.g., the RRU(s) that associates with the UE). In the exemplary embodiment, the MIMO scheme may includes a antenna scheme, or a combination of the antenna scheme and a site diversity scheme, wherein the antenna scheme may also includes an antenna multiplexing scheme and an antenna diversity scheme.

In the downlink signal process S31, once the MIMO scheme would be derived, the mapping unit may transmit a control signal that includes a MIMO scheme to the data processing unit 120, and then the data processing unit 120 may modulate the service flow into a MIMO stream according to the MIMO scheme (step S311). Also, the mapping unit 140 would transmit the allocation information which includes the allocated resource blocks and the RRUs corresponds to the allocated resource blocks (i.e., site mapping, the information of RRU(s) that being used to transmit this MIMO stream, in other words, information of the RRU(s) associated with the UE(s) corresponding to the service flow), so that the data processing unit may put the MIMO stream into the resource blocks (step S312) and distributes the MIMO streams into the downlink sub streams and transmits the downlink sub streams to the corresponding RRU(s) (i.e., the associated RRU(s) at the corresponding sites) (step S313).

On the other hand, in the uplink signal process S32, when the UE(s) transmits a data flow back to the base station 10, the UE(s) may modulates the data flow into a uplink MIMO stream by the MIMO scheme same with the MIMO scheme used in downlink signal process S31. The UE may also distributes a uplink MIMO stream into a plurality of uplink sub streams according to the allocation information (step S321), and transmit the uplink sub streams back to the base station 10. It is noted that, in this exemplary embodiment, the mapping unit 140 would not directly transmit the allocation information to the UE(s) that corresponds to the service flow, but the UE(s) would record resource blocks and the MIMO scheme from which resource blocks and the corresponding RRUs the sub streams (e.g., downlink sub streams) distributed from the MIMO stream are received, and the UE(s) may rebuild the allocation information thereby. As a result, the base station 10 may receive the uplink MIMO stream from the resource blocks and the corresponding RRUs same with the resource blocks and the corresponding RRUs that are used to transmit the MIMO stream (step S322). And the data processing unit 120 may combine the uplink sub streams into the uplink MIMO stream (e.g., merges all the uplink sub streams with the same resource block by mechanisms such as maximum ratio combining (MRC)) and demodulate uplink MIMO stream into the data flow according to the MIMO scheme, and then the data processing unit 120 may transfer the data flow back to the service provider (step S323).

For this exemplary embodiment, the current location of the UE(s) corresponding to the service flow would be estimated before the transmission of the MIMO stream (or the sub streams distributed from the MIMO stream) so that the mapping unit 140 could associates the RRU(s) with the UE, and allocates the resource blocks corresponding to the associated RRU(s). To be more specific, in order to derive the UE information, the base station 10 may respectively receive a preamble signal from all the UE in the coverage of RRU 111~11n, and may detects a distance and signal indicators between the all the UE and the RRU 111~11n. In the exemplary embodiment, the base station 10 may also receive a global positioning system (GPS) signal from the UE(s), and detects the distance through comparing the geographic location between the UE(s) and site #1-#n (i.e., the RRU 111~11n), or the base station 10 may also detects the distance through ranging process and/or gain control process.

When it is recognized that the a UE is in the radio coverage of two RRUs, or further, the distances between the UE and two (or more) RRU are similar, the two RRUs are associated with the UE, and the site diversity scheme can be applied in the MIMO stream that is bound to the UE. The site diversity scheme may use a space diversity characteristic to realize the MIMO scheme, such as, the site diversity scheme may be used to transmit/receive two same or data-correlated sub streams (downlink/uplink sub streams) to the same UE, so that the robustness of the transmission of the MIMO stream can be ensured. For example, assuming that a UE corresponding to a current-received service flow is in the radio coverage of both RRU 111 and 112, also the UE is at a location with the same distance to site #1 and site #2, (the estimation could be made by using the UE information derived by executing the above-describing GPS positioning process, ranging/gain control process), the mapping unit 140 may receive a location information from both BBU 131 and 132, and the mapping unit 140 may map the UE with the RRU 111 and 112, and set the MIMO scheme as the combination of the antenna scheme and the site diversity scheme. Whether to set the antenna scheme as the antenna multiplexing scheme or the antenna diversity scheme would be determined by the value of the signal indicators (e.g., signal strength or signal to interference ratios, round trip time . . . etc) between the UE and RRU 111 and 112, and the size of the allocated resource blocks corresponding to the RRU 111 and 112 may also change thereto. In this exemplary embodiment, signal indicators may includes the parameters for the base station 10 to estimate the location of the UE, such as the (estimated) distance of the UE, signal strength, signal to noise ratio, round trip time . . . etc, and also other parameters that indicates the channel quality between the UE and the base station 10, such as signal quality, a propagation loss, propagation delay . . . etc, but the disclosure is not limited thereto.

In this case, when an average value or a weighted value of signal indicators between the UE and RRU 111 and 112 is bigger than a threshold, the mapping unit 140 would set the MIMO scheme as the combination of antenna multiplexing scheme and the site diversity scheme. And when the average value or the weighted value of the signal indicators between the UE and RRU 111 and 112 is smaller than a threshold, the mapping unit 140 would set the MIMO scheme as the combination of antenna diversity scheme and the site diversity scheme. The threshold may vary according to actual implementation requirements so that the disclosure is not limited thereto.

The antenna scheme may use the diversity characteristic of antenna polarization to realize the MIMO scheme, which may includes antenna multiplexing scheme and the antenna diversity scheme. Herein, the antenna multiplexing scheme, could be used to improve the data transmission bandwidth, and antenna diversity scheme could be used to improve the immunity from noise or interference. For example, in the antenna multiplexing scheme, the antennas that are coupled to the same RRU may be used to transmit different part of the downlink/uplink sub streams in order to improve a throughput of the RRU, whereas in the antenna diversity scheme, the antennas that are coupled to the same RRU could be used to transmit data related to same part of the downlink/uplink sub stream (or the MIMO stream), so that a robustness of the downlink/uplink sub streams transmission could be ensured. For this exemplary embodiment, in the antenna diversity scheme, the sub streams (downlink/uplink sub streams) may be coded with a space-time encoding algorithm (e.g., the Alamouti coding algorithm) before transmitting to the coupled antennas, but the disclosure is not limited thereto.

In other words, during the situation when the average value or the weighted value of signal indicators between the UE and the RRUs are bigger than the threshold, and the situation represents that the signal strength and quality between the UE and the RRUs may be robust enough to avoid noise or other effects, the antenna multiplexing scheme could be selected to improve the data throughput. But during the situation when the average value or the weighted value of signal indicators between the UE and the RRUs are smaller than the threshold, and the situation represents that the signal strength may easily affected by noise, multi-path effect or other factors, the antenna diversity scheme could be selected to improve the correctness of the transmitted data.

Figure 4A:
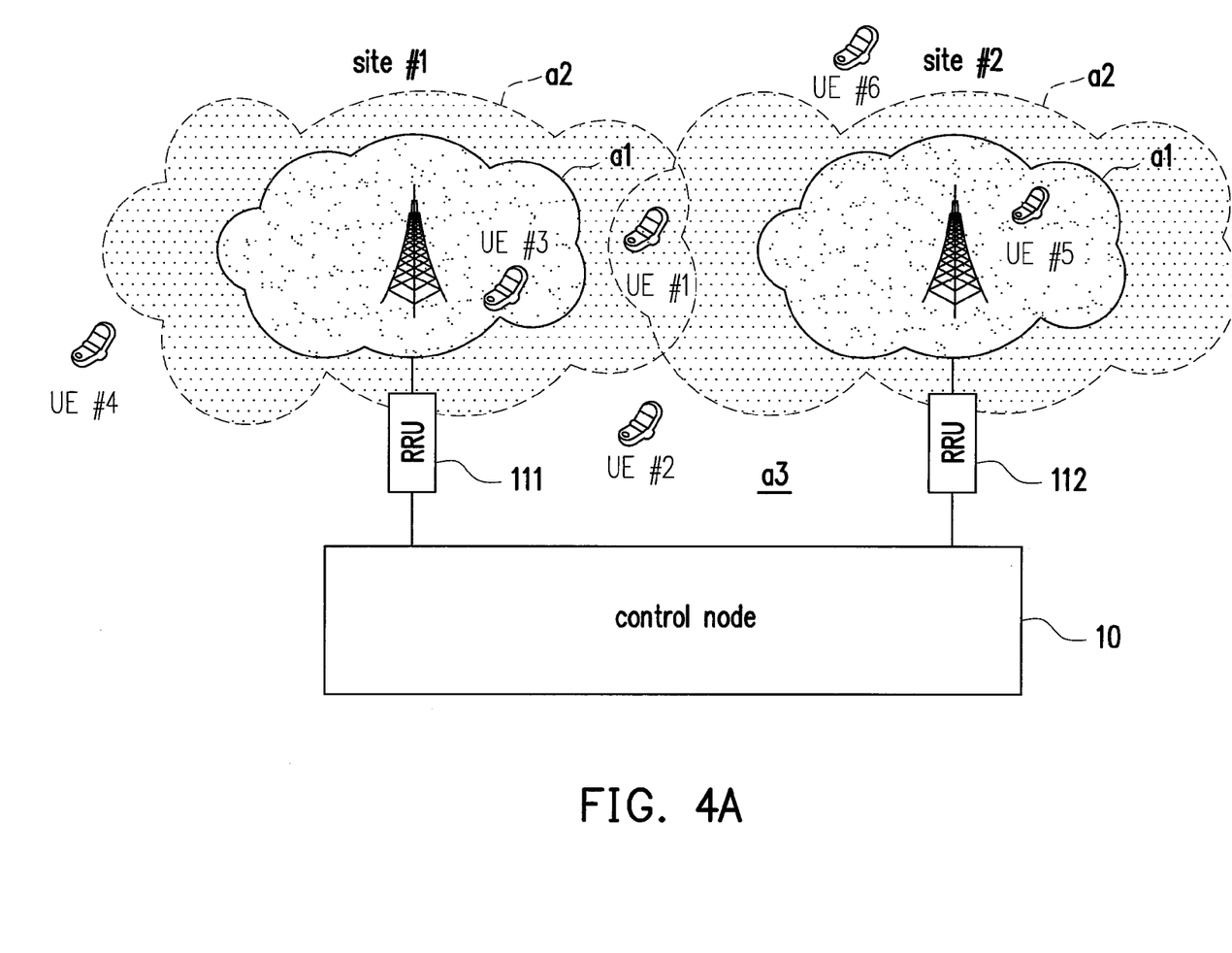
FIG. 4A is a schematic diagram illustrating a relationship between sites of the base station, and the locations of the UEs according to one of the exemplary embodiments.

FIG. 4A is a schematic diagram illustrating a relationship between sites of the base station, and the locations of the UEs according to an exemplary embodiment. Referring to FIG. 4A, the radio coverage of site #1 (corresponds to RRU 111) and site #2 (corresponds to RRU 112) includes area a1-a3, wherein the area a1 of site #1 and #2 are radio covered areas with the strongest signal strength and best signal quality, area a2 is area with signal strength and quality less than area a1, and area a3 is area with the poorest signal strength and quality.

In this exemplary embodiment, the mapping unit 140 would first determine which of the UEs meet the requirement of setting the site diversity scheme, and then set the antenna scheme for each of the UEs. For UE#1, the location of UE#1 is located in area a2, and both in the radio coverage of site#1 and site#2, so UE#1 would be associated with both RRU 111 and 112, the combination of antenna multiplexing scheme and site diversity scheme may be chosen as the MIMO scheme for a service flow corresponding to UE#1. As for UE#2, though the location of UE#2 is in both radio coverage of site#1 and site#2, so UE#2 could also be associated with both RRU 111 and 112, but the signal strength and quality may be poor owing to the location is in area a3, so the antenna diversity scheme and site diversity scheme may be chosen as the MIMO scheme for UE#2.

Assuming that both RRU 111,112 are respectively coupled to two antennas, and the each of the UE#1-UE#6 are equipped with 2 antennas, the transmission between UE#1 and the base station 10 could be seen as a 4×2 MIMO multiplexing transmission, and the transmission between UE#2 and the base station 10 can be seen as a 4×2 MIMO diversity transmission.

The location of UE#3 and UE#5 are respectively located in area a1 of site#1 and site#2 but outside of the radio coverage of another RRU (RRU 112 for UE#3, and RRU 113 for UE#5), the site diversity scheme may not be chosen in the selection of MIMO scheme. But the signal strength in area a1 may be strong, so for UE#3 and UE#5, the antenna multiplexing scheme may be set as the MIMO scheme. As for UE#4 and UE#6, UE#4 and UE#6 are at area a3 and with only one radio coverage of site#1 or site#2, the antenna diversity scheme may be chosen to improve the transmission quality. It is noted that the above description of FIG. 4A is just an example of determination of choosing the MIMO scheme according to the relative position of UEs, the determination of choosing the MIMO scheme may be more complicated in real practice.

Figure 4B:
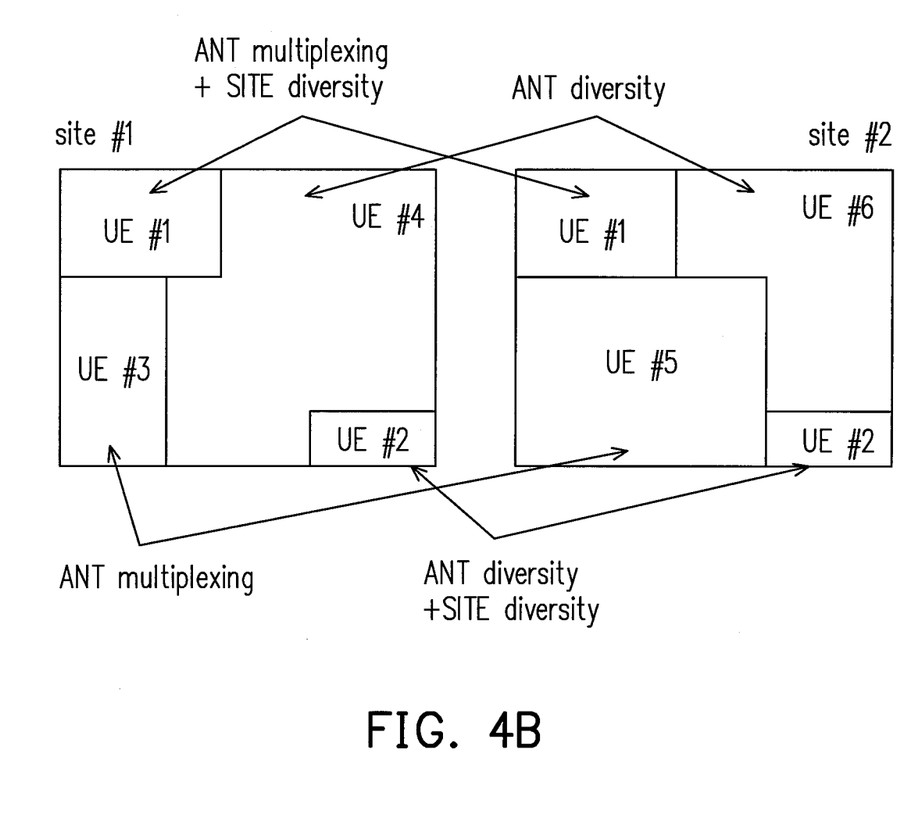
FIG. 4B is a schematic diagram illustrating communication resources of site #1 and site #2 corresponding to one of the exemplary embodiments of FIG. 4A.

FIG. 4B is a schematic diagram illustrating communication resources of site #1 and site #2 corresponding to the exemplary embodiment of FIG. 4A, which shows the relationship of resource blocks allocated for UE#1-#6 corresponding to the selection of the MIMO scheme. Referring to FIG. 4B, the UEs with site diversity scheme, e.g., UE#1 and UE#2, are assigned into the resource blocks in the communication resource of both site #1 and site #2. In addition, in this exemplary embodiment, the size of the resource blocks of UE#1 and UE#2 would be the same, and a relative position of in the resource blocks of UE#1 and UE#2 both communication resource of site #1 and site #2 would also be the same.

On the hand, UEs without site diversity scheme, e.g., UE#3-UE#6, are assigned only into the resource blocks in the communication resource of both site #1 or site #2. Also, the size of the resource blocks corresponding to UE#1-UE#6 may be determined according to several factors, such as the service type of the corresponding service flow, data rate of the service flow, or encoding scheme of the MIMO scheme . . . etc, and could be also dynamically adjusted according to actual implementation circumstances. It is noted that the priority of factors like MIMO scheme, the service type . . . etc may not be equal during the consideration of allocating the resource blocks. For example, in the present exemplary embodiment, the mapping unit 140 may allocate the resource blocks sequentially according to the MIMO scheme, the service type, the location of the UE and the RRUs associated with the UE in order.

Figure 5:
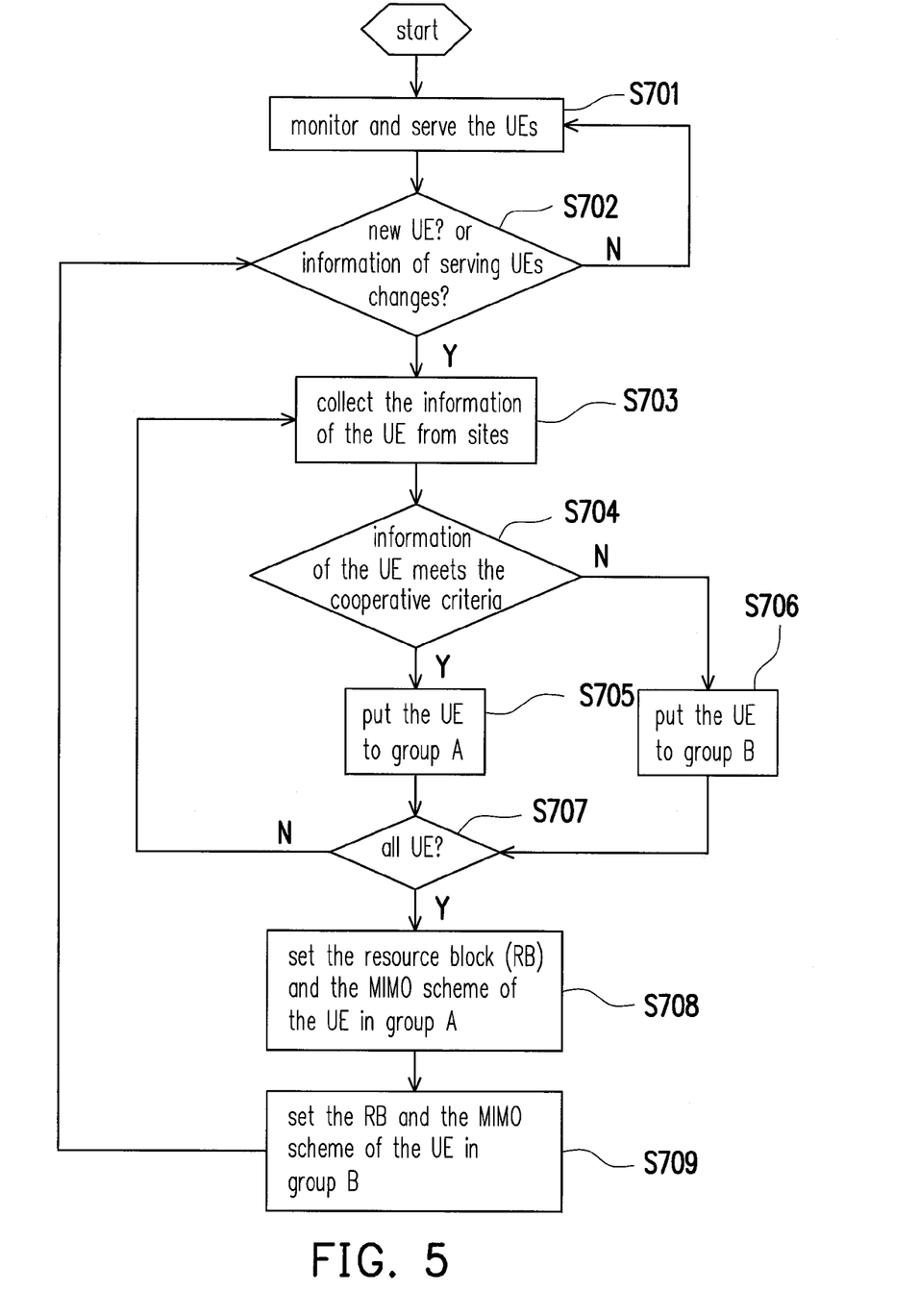
FIG. 5 is a flow chart illustrating a method for cooperative multiple-input-multiple-output (MIMO) wireless communication system according to one of the exemplary embodiments.

FIG. 5 is a flow chart illustrating a method for cooperative multiple-input-multiple-output (MIMO) wireless communication system according to an exemplary embodiment. Comparing to the exemplary embodiment shown in FIG. 1, FIG. 5 shows the method from different perspective of view, and can be seen as the detailed process of determining the MIMO scheme to each of the UE in exemplary embodiment of FIGS. 4A and 4B. Referring to FIG. 5, the base station 10 would first monitor and serve the UEs after detecting and estimating the locations of the UE in the radio coverage of the RRU 111~11n (step S701). And then, the base station 10 (BBU 131~13n through RRU 111~11n) further detects whether there's a new UE in the radio coverage of the RRU 111~11n or an information of the serving/existing UE(s) changes (e.g., the content of the UE information changes, such as a variation of the average value or the weighted value of the signal indicators is bigger than a preset value) (step S702), the mapping unit 140 collects the information of the UE (new or changed) from site#1-site#n through BBU 131~13n (e.g., updates the signal indicators or adds parameters corresponding to the new UE in the UE information) (step S703). If the base station 10 detects that there's no new UE in the radio coverage of the RRU 111~11n and the information of the serving/existing UE(s) would remain the same, the base station 10 would keep on monitoring and serving the existing UEs (step S701).

After the mapping unit 140 collects the information from the sites, the mapping unit 140 would determine whether the information of the UE (i.e., the information corresponding to each of the UE in the UE information) meets a requirement of cooperative criteria, i.e., determines whether the site diversity scheme could be set as the MIMO scheme or not according to the information of the UE (step S704). If yes, the base station 10 put the UE in group A (step S705), and the base station put the UE in group B if no (step S706). And after the determination of group A/B, the control once again would make sure that whether all of the UE in the radio coverage of RRU 111~11n have been putted into group A or B (S707), if no, the mapping unit 140 would recollect the information of non-grouped UE (step S703) and determine whether to put the non-grouped UE into group A or B (step S704-S706).

It is noted that the UEs in the radio coverage of RRU 111~11n may moves from radio coverage of some certain RRUs to another RRUs. In this circumstances, a in-control-node (or in-base-station) handover process would be executed by the base station 10 and the above-described information from the UE would also changed due to the moving of the UE, so the mapping unit 140 would once again determine whether to put this hand-over UE to group A or group B according to the above-described information including the consideration of the current location of the hand-over UE.

After all the UEs in the radio coverage of RRU 111~11n have been putted into group A or B, the mapping unit 140 would respectively set the resource blocks (RB) and the MIMO scheme of all the UE in group A (step S708), and respectively set the RB and the MIMO scheme of all the UE in group B (step S709).

Figure 6:
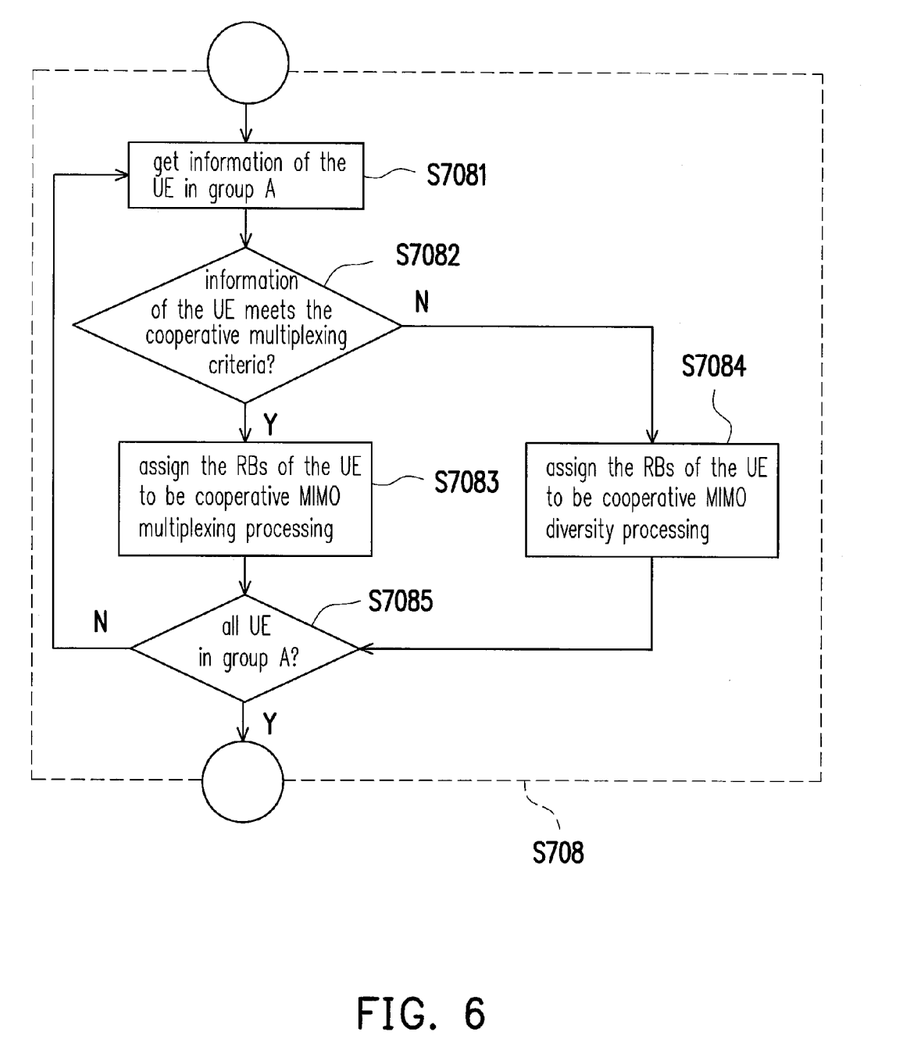
FIG. 6 is a flow chart illustrating setting the resource blocks (RB) and the MIMO scheme of all the UE in group A according to one of the exemplary embodiments.

FIG. 6 is a flow chart illustrating setting the resource blocks (RB) and the MIMO scheme of all the UE in group A according to an exemplary embodiment, which may also corresponds to step S708 in the exemplary embodiment of FIG. 5. Referring to FIG. 6, first, the mapping unit 140 would get the information of the UE in group A (e.g., retrieving information of the group A UEs from the UE information) (step S7081), and determines whether the information of the UE meets the cooperative multiplexing criteria, e.g., i.e., determines whether the MIMO scheme could be set as a combination of site diversity and the antenna multiplexing scheme according to the information of the UE (S7082). If yes, the mapping unit 140 would allocate the resource blocks according to the information of the UE and assigns the RBs of the UE to be cooperative MIMO multiplexing processing, i.e., the combination of site diversity scheme and the antenna multiplexing scheme (step S7083). If no, the mapping unit 140 would allocate the resource blocks according to the information of the UE and assigns the RBs of the UE to be cooperative MIMO diversity processing, i.e., the combination of site diversity scheme and the antenna diversity scheme (step S7084), and at step S7085, the mapping unit 140 would check that whether the RBs and MIMO scheme corresponds to all the UE in group A are assigned, if not, continuing step S7081-S7085 with the information of the un-assigned UE(s).

Figure 7:
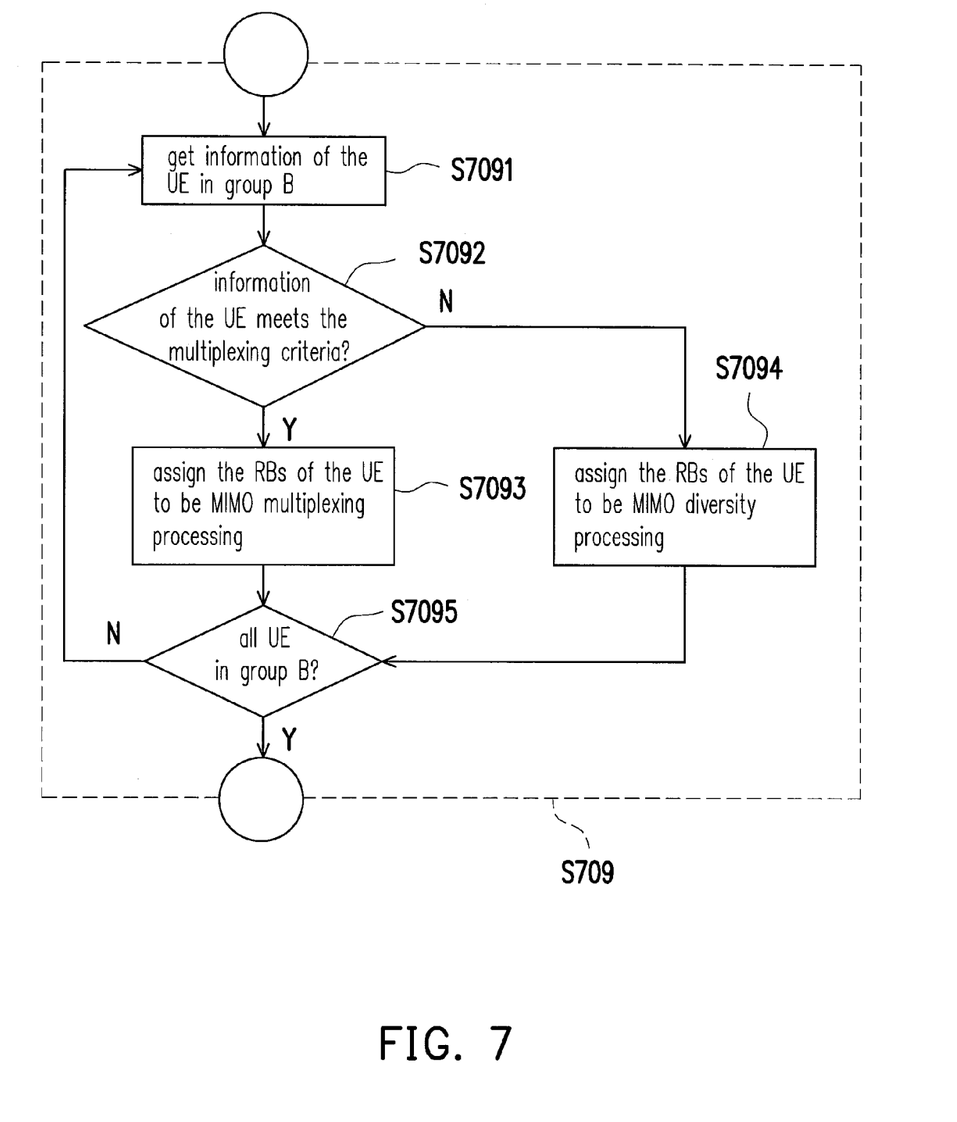
FIG. 7 is a flow chart illustrating setting the resource blocks (RB) and the MIMO scheme of all the UE in group B according to one of the exemplary embodiments.

FIG. 7 is a flow chart illustrating setting the resource blocks (RB) and the MIMO scheme of all the UE in group B according to an exemplary embodiment, which may also corresponds to step S709 in the exemplary embodiment of FIG. 5. Referring to FIG. 7, first the mapping unit 140 would get the information of the UE in group B (step S7091), and determine whether the information of the UE meets the multiplexing criteria, e.g., i.e., determine whether the MIMO scheme could be set as the antenna multiplexing scheme according to the information of the UE (S7092). If yes, the mapping unit 140 would allocate the resource blocks according to the information of the UE and assign the RBs of the UE to be MIMO multiplexing processing, i.e., the antenna multiplexing scheme (step S7093). If no, the mapping unit 140 would allocate the resource blocks according to the information of the UE and assigns the RBs of the UE to be MIMO diversity processing, i.e., the antenna diversity scheme (step S7094). And at step S7095, the mapping unit 140 would check whether the RBs and MIMO scheme corresponds to all the UE in group B are assigned, if not, step S7091-S7095 with the information of the un-assigned UE(s) would be continued.

In this disclosure, a method of cooperative multiple-input-multiple-output (MIMO) wireless communication and a base station using the same are proposed. the proposed method and the base station using the same may serve UEs at different locations with different methodology simultaneously, such as a cooperative MIMO signal processing with two RRUs, combined with a MIMO multiplexing scheme for throughput improving or a MIMO diversity scheme for robustness ensuring. and the method and the base station also monitors all the UE in the radio coverage of all RRUs of the base station, when a new UE adds in or a existing UE moving from an original location, the base station may serves the new UE or the existing UE with different location with a suitable MIMO signal processing scheme.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of cooperative multiple-input-multiple-output (MIMO) wireless communication, configured for a base station with a plurality of radio remote units (RRUs), wherein each of the RRUs respectively has a radio coverage and a plurality of antennas are coupled to each of the RRUs, wherein the RRUs locate on different geographical locations, the method comprising:
   receiving an user equipment (UE) information comprising a location of the UE;
   receiving a service flow from an application layer service provider;
   deriving a service type of the service flow, wherein the service type comprises a broadcast service type, a multicast service type, and a unicast service type;
   determining a MIMO scheme for modulating the service flow into a MIMO stream for the UE according to the service type and the UE information, wherein if the location of the UE is in an area within the radio coverage of at least two of the RRUs, the MIMO scheme of the UE is determined to be a site MIMO scheme performed by the at least two of the RRUs, wherein the MIMO scheme comprises an antenna scheme, or a combination of the antenna scheme and a site diversity scheme, wherein the antenna scheme comprises an antenna multiplexing scheme and an antenna diversity scheme;
   allocating a plurality of resource blocks to part or all of the RRUs according to the MIMO scheme, the UE information and the service type,
   modulating the service flow into the MIMO stream according to the MIMO scheme; and
   distributing the MIMO stream into a plurality of downlink sub streams and transmitting the downlink sub streams through the resource blocks by the part or all of the RRUs, wherein the at least two of the RRUs cooperatively transmit the downlink sub streams for the UE according to the site MIMO scheme.

2. The method according to claim 1, wherein the step of determining the MIMO scheme further comprising:
   detecting the UE corresponding to the service flow;
   estimating a location of the UE; and
   associating the UE with one or more RRUs according to the UE information.

3. The method according to claim 1, wherein in receiving phase, the method further comprising:
   collecting a plurality of uplink sub streams through the resource blocks by part or all of the RRUs which are corresponding to the resource blocks; and
   demodulating the service flow out of uplink sub streams according to the MIMO scheme.

4. The method according to claim 2, wherein:
   the MIMO scheme comprising an antenna scheme, or a combination of the antenna scheme and a site diversity scheme, wherein the antenna scheme comprising an antenna multiplexing scheme and an antenna diversity scheme.

5. The method according to claim 4, wherein the UE information comprises one or multiple parameters of signal strength, signal to interference ratio, round trip time, UE location and UE identifier.

6. The method according to claim 5, wherein the step of allocating one or multiple resource blocks further comprising:
   allocating one or multiple resource blocks sequentially according to the MIMO scheme, the service type, the location of the UE and the RRUs associated with the UE in order.

7. The method according to the claim 6, wherein the step of sequentially allocating one or multiple resource blocks comprising:
   allocating the resource blocks corresponding to the multiple RRUs prior to allocating the resource blocks corresponding to the one RRU.

8. The method according to claim 7, wherein:
   the service type comprising a broadcast service type, a multicast service type and a unicast service type,
   wherein when the service type of the service flow is the broadcast service type, allocating the resource blocks corresponding to all of the RRUs of the base station.

9. The method according to claim 8, wherein when the service type of the service flow is a unicast service type, the step of associating the UE with one or more RRUs comprising:
   determining the RRUs whose radio coverage covers the location of the UE;
   associating the UE with the RRUs whose radio coverage covers the location of the UE; and
   setting the MIMO scheme as the antenna scheme or the combination of the antenna scheme and the site diversity scheme.

10. The method according to claim 9, wherein when the part or all of the RRUs are associated with the UE, in receiving phase, the method further comprising:
    receiving uplink sub streams respectively by the part or all of the RRUs associated with the UE through the resource blocks of the part or all of the RRUs; and
    demodulating out of the received uplink sub streams.

11. The method according to claim 9, wherein when the part or all of the RRUs are associated with the UE, in transmission phase, the method further comprising:
    transmitting downlink sub streams respectively to the UE from the part or all of the RRUs through the resource blocks of the part or all of the RRUs associated with the UE.

12. The method according to claim 8, wherein:
    in the step of estimating the location of the UE, the method further comprising:
      measuring at least one signal indicator between the UE and at least one of the RRUs of the base station, wherein the location of the UE is located in the radio coverage of the at least one of the RRUs;
    when an average value or a weighted value of the at least one signal indicator is bigger than or equal to a threshold, setting the MIMO scheme as the antenna multiplexing scheme, or the combination of antenna multiplexing scheme and the site diversity scheme; and
    when the average value or the weighted value of the at least one signal indicator is smaller than a threshold, setting the MIMO scheme as the antenna diversity scheme, or the combination of antenna diversity scheme and the site diversity scheme.

13. The method according to claim 12, wherein:
    the signal indicator comprises one or multiple parameters to a signal strength, a signal quality, a propagation loss, propagation delay, and a distance between the UE and the at least one of the RRUs; and
    the step of generating the UE information further comprising:
      generating the UE information according to the at least one signal indicators between the UE and at least one of the RRUs of the base station.

14. The method according to claim 13, wherein the method further comprising:
    monitoring the at least one signal indicator, wherein when an average value or a weighted value of the at least one signal indicator reaches or crosses a preset threshold, determining whether to execute a handover process.

15. A base station of cooperative multiple-input-multiple-output (MIMO) wireless communication, the base station comprising:
   a plurality of radio remote units (RRUs), wherein each of the RRUs respectively has a radio coverage and a plurality of antennas are coupled to each of the RRUs, wherein the RRUs locate on different geographical locations;
   a plurality of baseband units (BBUs), respectively coupled between the data processing unit and the RRUs; and
   a processor, coupled to the BBUs, and programmed to execute:
      a data processing unit, coupled to the BBUs, receiving a service flow from an application layer service provider; and
      a mapping unit, coupled to the BBUs and the data processing unit, deriving a service type of the service flow, wherein the service type comprises a broadcast service type, a multicast service type, and a unicast service type, receives a user equipment (UE) information comprising a location of the UE through the BBUs and the RRUs, and determining a MIMO scheme for modulating the service flow into a MIMO stream for the UE according to the service type and the UE information, wherein if the location of the UE is in an area within the radio coverage of at least two of the RRUs, the MIMO scheme of the UE is determined to be a site MIMO scheme performed by the at least two of the RRUs, wherein the MIMO scheme comprises an antenna scheme, or a combination of the antenna scheme and a site diversity scheme, wherein the antenna scheme comprises an antenna multiplexing scheme and an antenna diversity scheme,
   wherein, the mapping unit allocates a plurality of resource blocks to part or all of the RRUs according to the MIMO scheme, the UE information and the service type, and transmits an allocation information to the data processing unit, wherein the resource blocks corresponds to part or all of the RRUs, and the allocation information corresponds to the allocated resource blocks, wherein the at least two of the RRUs cooperatively transmit the downlink sub streams for the UE according to the site MIMO scheme.

16. The base station according to claim 15, wherein the RRUs:
   in transmission phase,
      transmits a plurality of downlink sub streams according to the allocated resources blocks when receiving the downlink sub streams; and
   in receiving phase,
      receives a plurality of uplink sub streams according to the allocated resource blocks and transmits the uplink sub streams to the data processing unit via BBUs.

17. The base station according to claim 16, wherein the data processing unit
   in transmission phase,
      modulates the service flow into a MIMO stream by the MIMO scheme; and
      distributes the MIMO stream into the downlink sub streams according to the allocation information and transmits the downlink sub streams to the RRUs corresponding to the resource blocks via the BBUs.

18. The base station according to claim 17, wherein
   the mapping unit detects the UE corresponding to the service flow through the BBUs and the RRUs; and
   the RRUs generates the UE information by estimating location of the UE, and the mapping unit associates the UE with one or more RRUs according to the UE information and the location of UE.

19. The base station according to claim 18, wherein the data processing unit
   in receiving phase,
      demodulates the service flow out of the uplink sub streams received through part or all of the RRUs that corresponding to the allocated resource blocks according to the MIMO scheme.

20. The base station according to claim 19, wherein:
   the MIMO scheme comprising an antenna scheme, or a combination of the antenna scheme and a site diversity scheme, wherein the antenna scheme comprising an antenna multiplexing scheme and an antenna diversity scheme.

21. The base station according to claim 20, wherein the UE information comprises one or multiple parameters of signal strength, signal to interference ratio, round trip time, UE location and UE identifier.

22. The base station according to claim 21, wherein:
   the mapping unit allocates one or multiple resource blocks sequentially according to the MIMO scheme, the service type, the location of the UE and the RRUs associated with the UE in order.

23. The base station according to the claim 22, wherein:
   the mapping unit allocates the resource blocks corresponding to the multiple RRUs prior to allocates the resource blocks corresponding to the one RRU.

24. The base station according to claim 21, wherein:
   the service type comprising a broadcast service type, a multicast service type and a unicast service type, wherein when the service type of the service flow is the broadcast service type, the mapping unit allocates the resource blocks corresponding to all of the RRUs of the base station.

25. The base station according to claim 24 wherein:
   in transmission phase, when mapping unit determines that the service type of the service flow is the unicast service type, the mapping unit determines the RRUs whose radio coverage covers the location of the UE, and associates the RRUs whose radio coverage covers the location of the UE with the UE, and sets the MIMO scheme as the antenna scheme or the combination of the antenna scheme and the site diversity scheme.

26. The base station according to claim 24, wherein:
   when estimating the location of the UE, the mapping unit measures at least one signal indicator between the UE and at least one of the RRUs of the base station, wherein the current location of the UE is located in the radio coverage of the at least one of the RRUs;
   when an average value or a weighted value of the at least one signal indicator is bigger or equal to a threshold, the mapping unit sets the MIMO scheme as the antenna multiplexing scheme, or the combination of antenna multiplexing scheme and the site diversity scheme; and
   when the average value or the weighted value of the at least one signal indicator is smaller than a threshold, the mapping unit sets the MIMO scheme as the antenna diversity scheme, or the combination of antenna diversity scheme and the site diversity scheme.

27. The base station according to claim 26, wherein:
the signal indicator comprises one or multiple parameters to a signal strength, a propagation loss, propagation delay, a signal quality and a distance between the UE and the at least one of the RRUs; and
the mapping unit generates the UE information according to the at least one signal indicators between the UE and at least one of the RRUs.

28. The base station according to claim 26, wherein:
the mapping unit monitors the at least one signal indicator, wherein when an average value or weighted value of the at least one signal indicator is reaches or crosses a preset threshold, the mapping unit determines whether to execute a handover process.

* * * * *